US012748022B2

(12) United States Patent
Go et al.

(10) Patent No.: US 12,748,022 B2
(45) Date of Patent: Sep. 29, 2026

(54) SEPARATION DEVICE AND METHOD OF SEPARATION

(71) Applicant: PHYNEXUS, INC., San Jose, CA (US)

(72) Inventors: Gihoon Go, San Jose, CA (US); Don B. Aplaon, Saratoga, CA (US); Fanny Huang, San Jose, CA (US); Douglas T. Gjerde, Saratoga, CA (US)

(73) Assignee: PHYNEXUS, INC.

( * ) Notice: Subject to any disclaimer, the term of this patent is extended or adjusted under 35 U.S.C. 154(b) by 605 days.

(21) Appl. No.: 18/248,107

(22) PCT Filed: Oct. 6, 2021

(86) PCT No.: PCT/US2021/053751
§ 371 (c)(1),
(2) Date: Apr. 6, 2023

(87) PCT Pub. No.: WO2022/076543
PCT Pub. Date: Apr. 14, 2022

(65) Prior Publication Data

US 2023/0408383 A1 Dec. 21, 2023

Related U.S. Application Data

(60) Provisional application No. 63/166,431, filed on Mar. 26, 2021, provisional application No. 63/087,996, filed on Oct. 6, 2020.

(51) Int. Cl.
*G01N 1/40* (2006.01)
*B01L 3/00* (2006.01)

(52) U.S. Cl.
CPC ...... *G01N 1/4005* (2013.01); *B01L 3/502753* (2013.01); *B01L 2200/0631* (2013.01); *G01N 2001/4016* (2013.01)

(58) Field of Classification Search
CPC ............... A45D 8/34; B01L 2200/0631; B01L 2300/069; B01L 3/0275; B01L 3/502753;
(Continued)

(56) References Cited

U.S. PATENT DOCUMENTS 4,627,918 A 12/1986 Saxena
6,566,145 B2 5/2003 Brewer
(Continued)

FOREIGN PATENT DOCUMENTS

CN 101972558 A 2/2011
CN 111542380 A 8/2020
(Continued)

OTHER PUBLICATIONS

International Preliminary Report on Patentability dated Apr. 20, 2023 issued in PCT/US2021/053751.
(Continued)

*Primary Examiner* — Jennifer Wecker
*Assistant Examiner* — Jonathan Bortoli
(74) *Attorney, Agent, or Firm* — Harness, Dickey & Pierce, P.L.C.

(57) ABSTRACT

The present invention relates to the readily automated methods for the separation of biomolecules, such as proteins or nucleic acids. More specifically, the invention relates to a separation device, which includes at least one column provided with a bottom liquid inlet/outlet and adapted to receive a separation media. At least part of an elongated frit has been arranged substantially parallel to the column side walls, segregating the separation media from the bottom liquid inlet/outlet. The elongated frit may be shaped as a tube and should have a porosity that serves to retain separation media within the column during sample processing. Further, the invention relates to a method of separating at least one target molecule from a liquid, which method comprises providing
(Continued)

at least one column provided with a bottom liquid inlet/outlet and optionally with a top liquid inlet. The column retains a separation media; and at least part of an elongated frit has been arranged substantially parallel to the column side walls to segregate the separation media from the bottom liquid inlet/outlet. A liquid sample is processed in said column in a method including aspiration and dispensing of fluid to and from the bottom liquid inlet/outlet; adding a liquid at the top liquid inlet; or any combination thereof.

30 Claims, 5 Drawing Sheets

(58) Field of Classification Search
CPC ......... G01N 1/4005; G01N 2001/4016; G01N 30/603; A47J 31/605; B01D 2201/4023; B01D 2201/4084; B01D 24/10; C02F 1/001; C02F 2201/006; C02F 2301/043
See application file for complete search history.

(56) References Cited

U.S. PATENT DOCUMENTS

| | | | | |
|---|---|---|---|---|
| 6,761,855 | B1 | 7/2004 | Cook et al. | |
| 7,172,696 | B1 | 2/2007 | Martinez et al. | |
| 7,185,551 | B2 | 3/2007 | Schwartz | |
| 7,482,169 | B2 | 1/2009 | Gjerde et al. | |
| 9,733,169 | B2 | 8/2017 | Brewer | |
| 2003/0039589 | A1 | 2/2003 | Smith | |
| 2004/0072375 | A1 | 4/2004 | Gjerde et al. | |
| 2006/0124551 | A1 * | 6/2006 | Gjerde .................. | B82Y 30/00 210/656 |
| 2006/0213823 | A1 * | 9/2006 | Rigoli .................. | G01N 30/603 73/61.53 |
| 2008/0119637 | A1 | 5/2008 | Gjerde et al. | |
| 2016/0363565 | A1 | 12/2016 | Rannisto et al. | |
| 2017/0354966 | A1 | 12/2017 | Mullis et al. | |
| 2018/0120270 | A1 | 5/2018 | Saxena et al. | |

FOREIGN PATENT DOCUMENTS

| | | | |
|---|---|---|---|
| EP | 2177915 | A1 | 4/2010 |
| JP | S63-501693 | A | 7/1988 |
| WO | WO-0188185 | A2 | 11/2001 |

OTHER PUBLICATIONS

First Office Action issued Jan. 7, 2026 in Chinese Application No. 202180065189.0.

International Search Report PCT/ISA/210 for PCT/US2021/053751 dated Jan. 25, 2022.

* cited by examiner

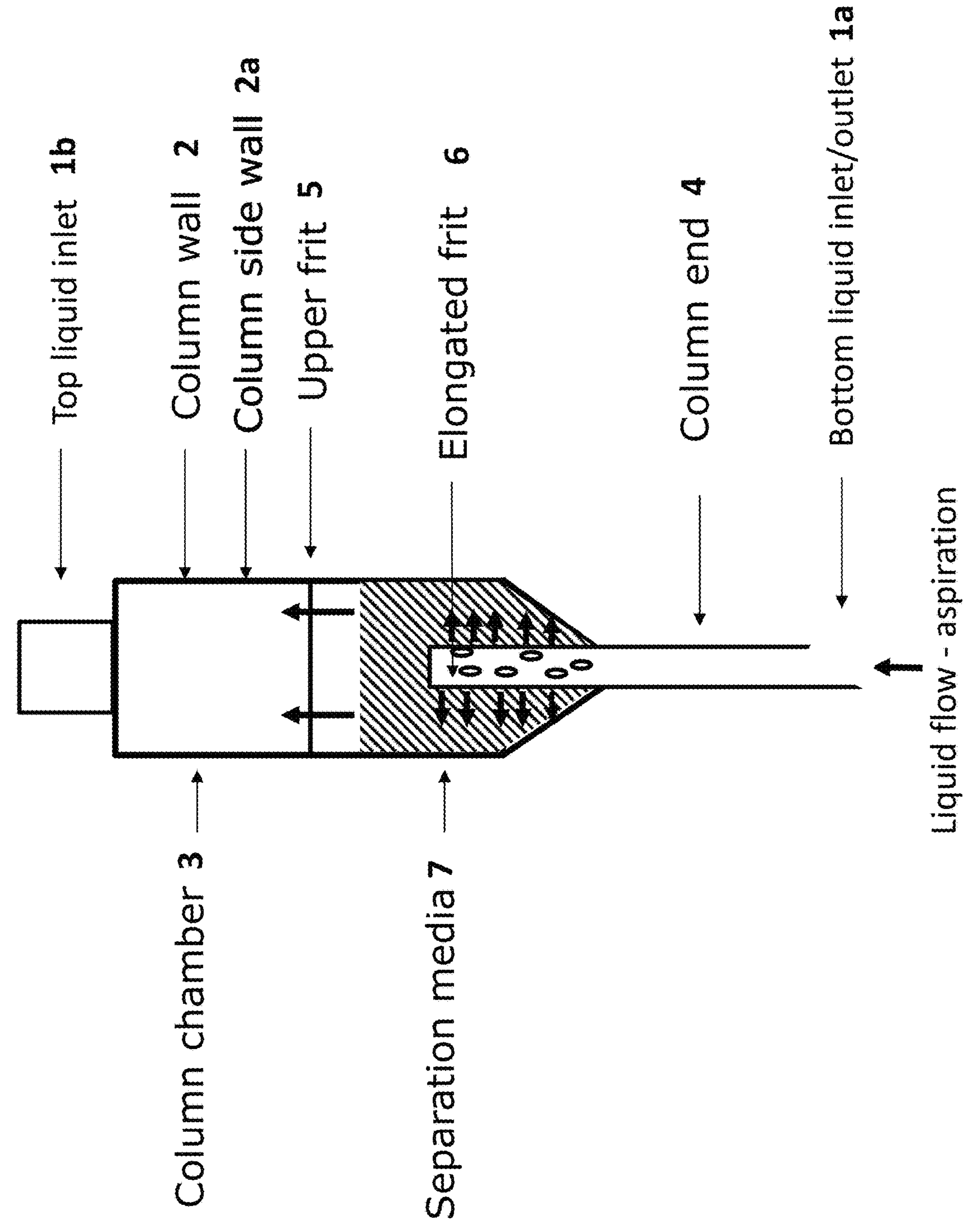
Figure 1 - Column during liquid aspiration phase

Figure 2 - Column during liquid dispensing phase
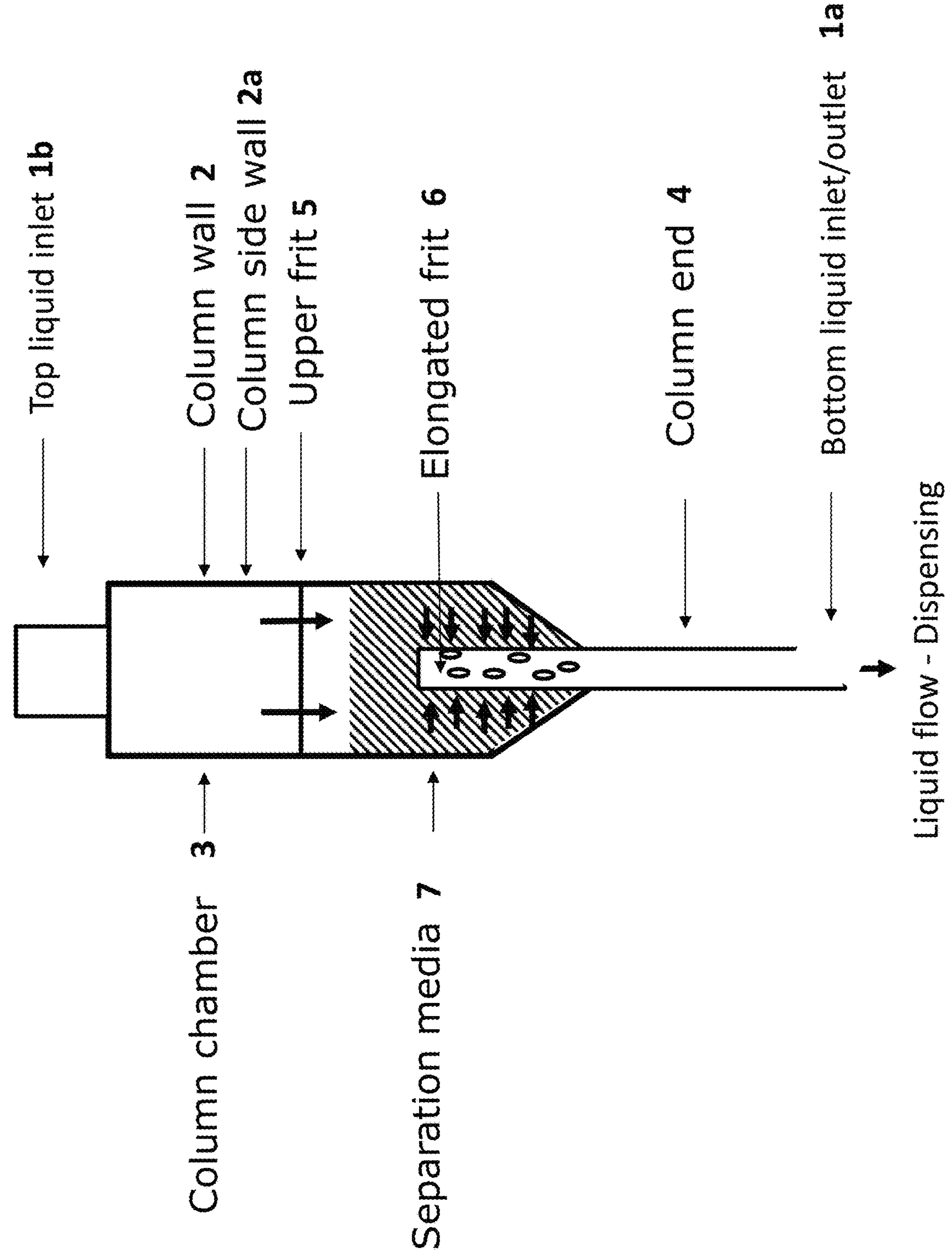

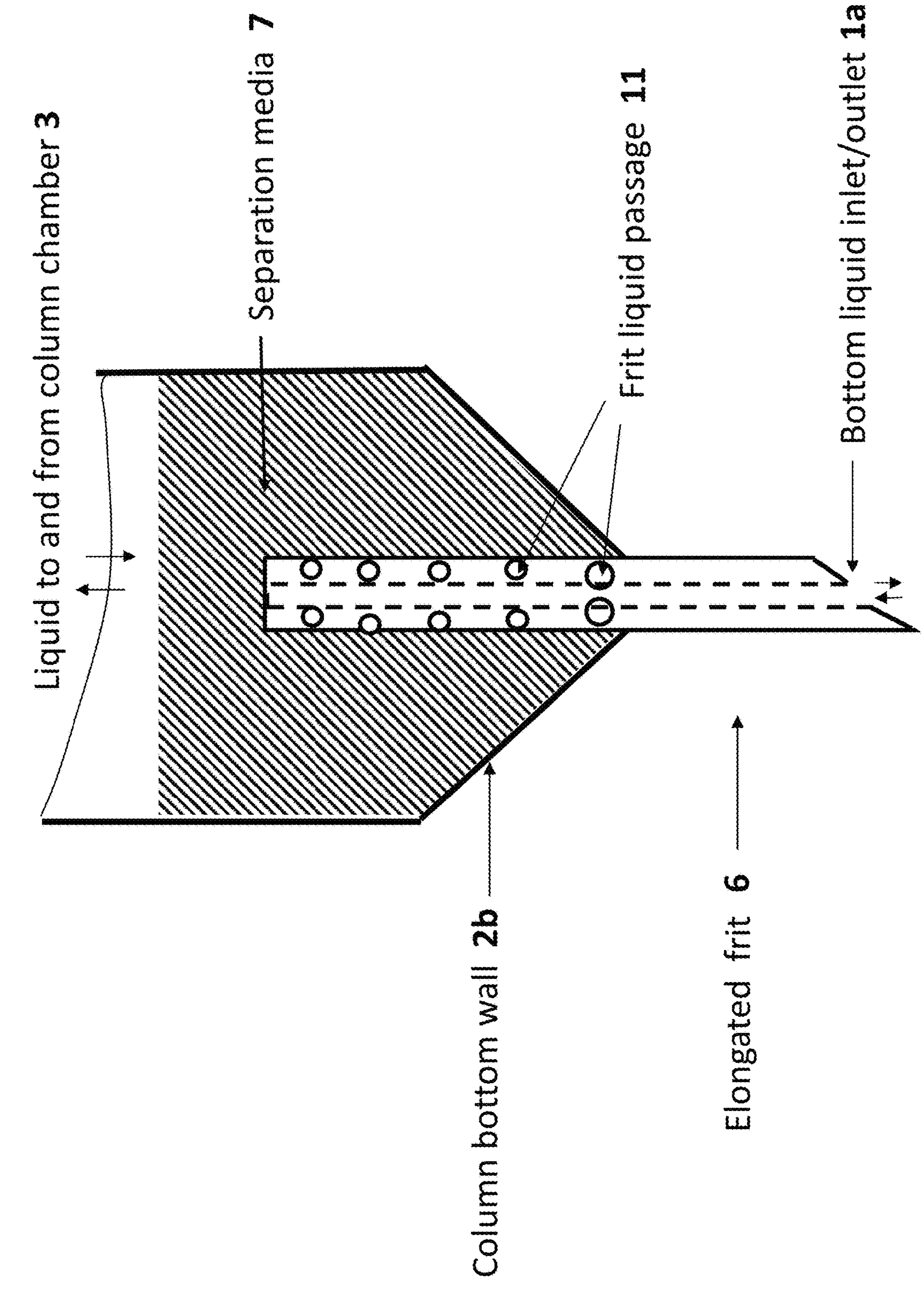
Figure 3 - Elongated frit arranged in separation media

Figure 4 –Assembly of tube frit

Figure 5 - General performance for plasmid purification

| Sample Prep Plasmid Scale | Cell Pellet Weight Per sample (g) | Tube Frit column bed volume (mL) | Elution Concentrations (ng/µL) | Elution Volume (mL) | Yield Plasmid (mg) | Endotoxin Levels (EU/µg) | 1 and 2 Samples Method Run Time | 3 and 4 Samples Method Run Time |
|---|---|---|---|---|---|---|---|---|
| **Maxi** | 3 | 5 | 170 - 230 | 10 | 1 | < 0.1 | 38 min | 1 hour 45 min |
| **Mega** | 7.5 | 10 | 170 - 230 | 40 | 5 | < 0.1 | 1 hour 45 min | 3 hour 30 min |
| **Giga** | 15 | 20 | 200 - 350 | 45 | 10 | < 0.1 | 2 hour 45 min | 5 hour 45 min |

SEPARATION DEVICE AND METHOD OF SEPARATION

This application is a national phase under 35 U.S.C. § 371 of PCT International Application No. PCT/US2021/053751 which has an International filing date of Oct. 6, 2021, which claims priority to U.S. Application No. 63/166,431, filed Mar. 26, 2021, U.S. Application No. 63/087,996 filed Oct. 6, 2020 the entire contents of each of which are hereby incorporated by reference.

TECHNICAL FIELD

The present invention relates to the area of separation of target molecules, preferably by automated liquid processing. More specifically, the invention relates to a separation device, which enables efficient separation of target molecules, for example by parallel processing. The invention also embraces a method of separating target molecules, e.g. a method of automatically processing a liquid sample comprising the target molecules in sample volumes which may be in the range of 100 mL-5 L.

BACKGROUND

Conventional chromatographic columns may be constructed with a packed bed of media contained by a top and a bottom frit. A specific range of columns is the PhyTip® pipette tip columns (Phynexus Inc., phynexus.com), which are constructed with pipette tip column bodies. Frits are positioned at the top and bottom distal end of the tip with column media placed between the two frits. Currently, the largest commercially available PhyTip® pipette tip columns are 20 mL.

In the area of chromatography, it is known that larger bed volumes limit the amount a chamber space above the upper frit, thus limiting the sample volume that can be processed. However, a potentially more serious problem is that the backpressure of a column will increase dramatically as the bed volume is increased slowing the flow rate of sample and buffers pumped through the column. Large samples volumes are desired; however, by limited both column chamber volume and flow rate, the ability to process large sample volumes is compromised.

U.S. Pat. No. 9,733,169 relates to an extraction device used during sample preparation for chemical analysis. More specifically, according to U.S. Pat. No. 9,733,169, conventional pipette extraction products, such as disposable pipette extraction products, including those described in U.S. Pat. No. 6,566,145, use loosely contained sorbent inside of a pipette tip, where the sorbent is contained through the use of a lower screen, or filter, and an upper porous barrier. This type of pipette tip extraction device utilizes dispersive SPE, where the term "dispersive" refers to the solid phase sorbent being thoroughly mixed with liquid solutions aspirated into the pipette tip.

However, according to U.S. Pat. No. 9,733,169, such disposable pipette extraction does not work well with narrow and low volume tips. In fact, it is stated that such disposable pipette extraction may be irreproducible when incorporated in 1 mL pipette tips, as is commonly used for 96 well plates and robotics.

To overcome this problem, it has been proposed to overcome this problem by incorporating an intermediate porous barrier, which ensures the sorbent being mixed with the solutions at aspiration and dispensing, and which allows liquid solutions to pass through, but prevents the sorbent from passing through.

According to the '169 patent, the proposed intermediate barrier may cause losses in recovery because some of the liquid solution will inevitably get trapped by the porous membrane. In addition, the existence of such a barrier will create back pressure issues. Consequently, it is an object of the '169 patent to provide a dispersive SPE device that may be used to process liquid sample solutions for reproducible chemical analysis with low hack pressure.

To this end, the '169 patent describes a pipette tip device which includes a pipette tip having a volume of about 1 mL or less and a lower barrier at its narrow (lower) end, and a porous upper barrier at its wide opening (upper end), with loose sorbent between barriers. To provide turbulent mixing of sorbent and liquid, the '169 patent proposes a baffle system interior to the pipette tip.

Further, automated systems for larger scale purification are commercially available from Phynexus Inc. (phynexus.com/wp-content/uploads/AutoPlasmid_MMG_Automated_Plasmid_Purification_v52019.pdf), offering fully automated maxiprep, megaprep and giga prep scale purification of plasmid DNA. The PhyNexus AutoPlasmid MMG uses dual-flow chromatography, and includes 200+ or 1000+ PhyTip columns which include upper and lower low dead volume frits.

WO 01/88185 relates to filter elements which can be incorporated in apparatus and used to separate nucleic acid in liquid samples from solid contaminants. Specifically, the described filter element may be formed from a material having a rigid porous structure with a pore size between about 10 and about 200 microns, the filter element having an end wall and one or more side walls extending out of the plane of the end wall, so that when a liquid sample comprising nucleic acid and solid contaminants is introduced into the element, the liquid containing the nucleic acid filters through the side and/or end walls, while the solid contaminants are retained. In one embodiment, the described filter element is tubular and has a closed end so that when a sample comprising liquid and solid material contacts the filter element, e.g. when it is drawn into a pipette tip or syringe in which the filter is retained, the liquid filters through the side walls and out of the open end of the tube, while the solid material is initially builds up and is retained on the end wall.

EP 2 177 915 relates to a column tip processing device and a method. Its objective is to enhance the contact between a packing and a fluid as a subject to be processed whereby accomplishing a highly efficient reaction as well as an accurate processing. By varying the ratio between the bead volume forming the packing and the tip-shaped vessel's capacity, and especially by selecting the packing volume which gives a ratio which allows the interstice instead of a densely enclosed state in the tip-shaped vessel whereby allowing suction or discharge to be conducted at a flow rate allowing a liquid turbulence to occur in the column tip, a sufficient contact between the packing and the subject fluid is ensured, whereby enabling a highly efficient processing. In addition, by taking the pore size or the number of pores per part area into account, an appropriate suction or discharge flow rate can be determined.

However, due to constantly increased demands of faster and more efficient liquid processing of large volumes of sample, there exists a need in this area to improve the ability to process large liquid sample volumes and to increase the rate by which sample and buffer flows through the column without increasing column backpressure.

Samples which are suitable for the above-discussed kind of processing commonly involve biomolecules, such as proteins, nucleic acids and related molecules. Such molecules are targeted for many different applications, such as cell and gene therapy. Adeno-associated virus (AAV) vector-based gene therapy has now reported many successes. Two AAV-based gene therapies are currently FDA-approved: Luxturna in 2017 for a rare inherited retinal dystrophy, and Zolgensma last year for spinal muscular atrophy. Additionally, positive results have been reported from AAV vector-based clinical trials for the treatment of an early childhood blindness, hemophilia and many other diseases.

Purification methods for AAV are currently and primarily based on affinity chromatography directed to the unique properties of each AAV capsid. One example of an affinity resin is AVB Sepharose. AVB Sepharose is based on single-domain antibody fragments from the family Camelidae. The ligand used in AVB Sepharose was isolated from llamas naturally exposed to wild-type AAV. Thus, many AAV serotypes bind to this resin. Other resins include POROS™ Capture Select™ AAV Resins (Thermo Fisher): AAV8, AAV9 and AAVX.

Ion exchange chromatographic separation methods may be used for virus purification. For example, methods based on charge differences can be useful in the separation of empty AAV capsids from genome vector containing AAV capsids. Affinity and ion exchange chromatography may be combined.

Mammalian virus purification, such as from influenza, may be performed with the mixed-mode CHT (ceramic hydroxyapatite) media. CHT Media are a group of mixed-mode calcium affinity/cation exchange supports available from BioRad. The high negative surface charge on many viruses allows them to bind tightly to CHT calcium sites, permitting high yield purification.

SUMMARY OF THE INVENTION

A first aspect of the present invention is a separation device comprising at least one column provided with a bottom liquid inlet/outlet and adapted to receive a separation media; wherein at least part of an elongated frit has been arranged substantially parallel to the column side wall segregating separation media from the bottom liquid inlet/outlet.

A second aspect of the invention is a method of separating at least one target molecule from a liquid, which method comprises providing at least one column, which is provided with a bottom liquid inlet/outlet and optionally with a top liquid inlet, which column retains a separation media; wherein at least part of an elongated frit has been arranged substantially parallel to the column side wall and segregating the separation media from the bottom liquid inlet/outlet; and processing a liquid sample in said column in a method including aspiration and dispensing of fluid to and from the bottom liquid inlet/outlet; adding a liquid at the top liquid inlet; or any combination thereof.

Further embodiments, details and advantages of the invention will appear from the dependent claims as well as the whole specification of the present application.

Definitions

The term "separation media" is used herein for any conventional solid phase media, such as chromatography media in particulate form, which particles are porous and include separation functionalities. Chromatography media is commonly grouped into media which comprises organic or inorganic solid particles. Organic separation media is often divided into natural polymers, such as agarose and dextrose; and synthetic polymers, such as styrene and divinyl benzene (DVB); while inorganic media include solid phases such as silica and diatomaceous earth. Separation functionalities may be ligands coupled to the surfaces; and/or chemical entities of the solid support that are available for and capable of interacting with a target molecule.

The term a "bed" of media is used broadly herein for a layer of separation media, which has not yet been dispersed by a liquid flow. Thus, a "bed" as used herein is not required to have been packed by applied external pressure—as the skilled person will realize, it may be more or less densely packed, or simply sedimented, by a liquid passing downwards in a column as described herein.

The term "dispersed media" is used herein for media dispersed by a flow of fluid, such as liquid. "Dispersed" media particles move freely; and are not present as a packed bed. The term "perpendicular" flow is used herein for a flow which exits the side of an elongated frit into a separation media more or less in the direction of the sides of the column (the column wall).

The term "dual chromatography flow", also known as "back-and-forth flow", moves liquid two or more times in and out of a column, entering and exiting the column distal end.

The term "virus" is a submicroscopic infectious agent that replicates only inside the living cells of other organisms. As obligate intracellular parasites, viruses must infect cellular hosts in order to complete their life cycles, which they achieve by co-opting or "hijacking" the host cell's molecular machinery for their own reproduction. While not inside an infected cell or in the process of infecting a cell, viruses exist in the form of independent virions. Most virions are exceedingly simple in structure and physically minute, averaging just 1% the size of the typical bacterium. Viruses are found in almost every ecosystem on Earth and infect all types of life forms, from animals and plants to microorganisms such as bacteria and archaea. For the purpose of this application, the term virus includes the terms viruses, virion and virions.

The terms used herein to describe volumes of sample—"Maxipreparation" (short "maxi prep"); "Megapreparation" (short "mega prep"); and "Gigapreparation" (short "giga prep")—are used herein as commonly used in the area of plasmid separation.

Thus, a "maxi prep" scale commonly involves a starting culture sample volume of 100-200 mL, with an expected DNA yield of 500-850 μg; a "mega prep" scale commonly involves a starting culture sample volume of 500 mL-2.5 L, with an expected DNA yield of 1.5-2.5 mg; and a "giga prep" scale commonly involves a starting culture sample volume of 2.5-5 L, with an expected DNA yield of 7.5-10 mg. The term Terapreparation is 10 times a Gigapreparation.

The term "axil flow" is used herein as opposed to radial flow, and refers to a flow which in a vertically arranged chromatography column runs either from the upper end to the lower end; or the other way around.

BRIEF DESCRIPTION OF THE DRAWINGS

FIG. 1 is provided to illustrate how, in a column of the separation device according to the invention, the liquid flow is directed from a bottom liquid inlet 1*a* and up during a phase of aspirating liquid.

FIG. 2 illustrates, in the same column as in FIG. 1, how liquid can flow in the opposite direction, i.e. from the top liquid inlet 1*b* towards a bottom liquid outlet 1*a* of the column, during dispensing of liquid.

FIG. 3 is an expanded view of an elongated frit 6, here too shaped as a tube frit, arranged in separation media 7. Frit liquid passages 11 are shown schematically as holes (size not shown in dimension). The sloped column side wall 2*b* appears at the lower end of the column.

FIG. 4 illustrates how an elongated frit 6 may be assembled by wrapping mesh 10 around a tubular hollow support 9.

FIG. 5 is a table outlining the general performance for plasmid purification according to the invention.

DETAILED DESCRIPTION OF THE INVENTION

Figures 4A, 4B:
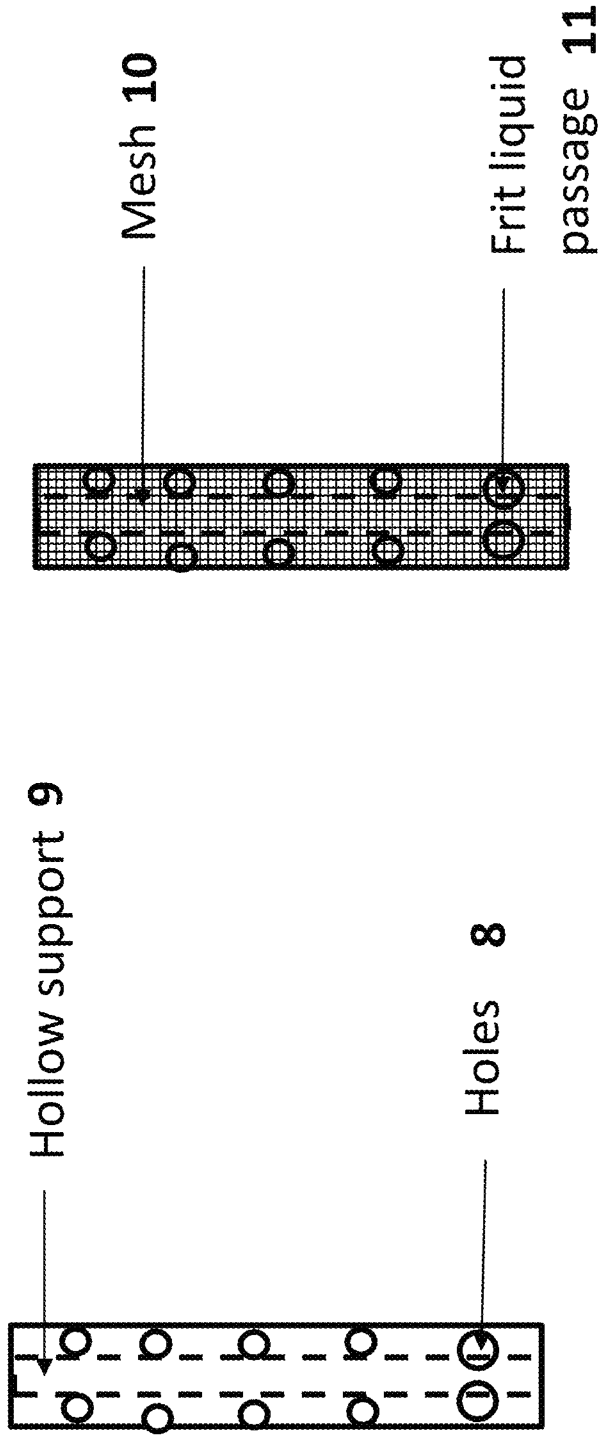
In FIG. 4*a*, the hollow support is shown as having holes 8 enabling fluid passage.
In FIG. 4*b*, a tube frit—an example of an elongated frit 6 according to the invention—has been assembled from a tubular hollow support 9 over which porous mesh 10 has been wrapped.

The present invention will now be described with reference to the drawings. As appears from above, in a first aspect, the present invention relates to a separation device comprising at least one column provided with a bottom liquid inlet/outlet 1*a* and adapted to receive a separation media; wherein at least part of an elongated frit 6 has been arranged substantially parallel to the column side wall 2*a* and segregating separation media 7 from the bottom liquid inlet/outlet 1*a*.

Thus, by an appropriate selection of dimensions, in particular the porosity, the elongated frit 6 may prevent separation media 7 from leaving the column.

The bottom inlet/outlet 1*a* is adapted for passage of liquid in and out of the column, allowing for aspiration and dispensing of liquid. Further, the present column may comprise a top liquid inlet 1*b*, adapted for passage of liquid into the column i.e. top down flow.

In this context, the term 'column side wall' 2*a* is understood to mean the parallel (e.g. tubular) wall of the column body rather than any sloped top or end part of a column, herein denoted the column bottom wall 2*b*. Differently worded, at least part of the elongated frit 6 according to the invention is substantially vertically positioned within the column. As clear to the skilled person, the column will be vertically positioned during operation.

The elongated frit 6 is according to the invention arranged to provide for a direction of liquid flow which is substantially perpendicular to the column wall 2 as liquid is passed across the column during sample processing. In other words, as liquid crosses the elongated frit 6, its direction of flow will be substantially horizontal, when viewed in a vertically positioned column. Further, the elongated frit is arranged not to collect any solid contaminants, as will appear from the more detailed disclosure below.

The liquid flow in a vertically arranged separation column according to the invention will be combination of perpendicular and axial flow, since the direction of flow will change as liquid passes the elongated frit 6, optionally in a back and forth mode. In one embodiment, the liquid flow is axial at the lower part of the column, while it is perpendicular at the upper part of the column with a transition liquid flow area between. Advantageously, there will be no, or very little, dead flow areas along the outer edges of the column where the elongated frit is operating, especially at the inlet to the chamber of the column.

The flow provided according to the invention will allow for dispersion of separation media 7 as liquid is aspirated from the bottom, in turn providing for an efficient mixing and capture of a target molecule by the separation media 7.

As liquid is dispensed from the column to the bottom inlet/outlet 1*a*, the separation media will settle. In this context, it is understood that the 'bottom inlet/outlet' 1*a* is located at the distal end of the column, as will appear from the drawings.

As the skilled person will appreciate, separation media 7 may be positioned in the column as a more or less densely packed bed, which may advantageously be dispersed by an upward flow obtained as described above, and which may be re-packed, or return to a more sedimented form, as liquid is dispensed. Advantageous bed volumes may be from the smaller sizes of about 20, 15, 10, 5, 3, 2 and 1 mL, or even as small as 50 and 100 μL; and up to larger sizes of up to about 100 mL, about 1 L and about 10 L and even large sizes up to about 50, 100, or 200 L. An advantageous separation bed is of a volume selected from the group consisting of 20, 10 and 5 mL. As discussed in more detail below in relation to the second aspect of the invention, the column according to the invention allows for back-and-forth flow.

In the present context, the term "substantially parallel to the column wall" should be understood as not horizontally arranged in a vertically (upright) arranged column, such as positioned at an angle that provides for the direction of flow described above. For example, at least part of the elongated frit 6 may be arranged at an angle within a broader range, such as about 45-90° to the horizontal plane, assuming that the column is arranged vertically.

In this context, the term "at least part of" should be understood in a broad sense, providing for a liquid flow, which constitutes a part of the total flow, directed substantially perpendicular to the column side wall 2*a* as it passes across the column during sample processing.

An upper frit 5 may be arranged in the above-described column at a position which allows for the column to receive separation media 7 below. Thus, the upper frit 5 is used as conventional to retain separation media 7 and prevent it from reaching the column top during liquid sample processing.

According to the present invention, a volume herein denoted a column chamber 3 may be arranged in the column, above the upper frit 5, as shown in FIGS. 1 and 2. Thus, after having dispersed the separation media 7, the liquid flow is directed upward going through the top frit 5 and into the column chamber 3. The column chamber 3 volume may be for example about 40 mL, allowing processing of 40 mL aliquots of sample liquid. However, the column according to the invention may be configured to virtually any size and column chamber size, including virtually any volume of separation media 7.

As the skilled person will appreciate, an essential factor for efficient processing is that the liquid flow into the column should be strong enough to disperse the separation media 7, at least to some extent. The skilled person will also appreciate that larger columns and lower aspiration backpressure will require faster liquid flows.

In an illustrative embodiment described here, the liquid flow rate was 100 mL/min.

Further, the positioning of said upper frit 5 in accordance with the invention may allow for separation media 7 as well as free space below said upper frit 5, as appears from FIGS. 1 and 2. In other words, when separation media 7 has been arranged in the column, such as in the form of a packed bed, a free volume will be available between the separation media 7 and the upper frit 5. During processing, the said volume will be more or less occupied with dispersed separation media, as described above.

During sample processing, the dispersion of the separation media 7 in accordance with the invention will enable an efficient mixing of a liquid sample with the separation media. During such mixing, molecules from the sample, such as biomolecules, with interact with the available surface area of the media, e.g. by ionic interactions; by hydrophobic interactions; by affinity interactions of 'lock-key' type, depending on the kind of separation media selected. Thus, target molecules, such as biomolecules, may be bound, captured or otherwise retained according to any commonly known separation principle.

The column according to the invention may retain any separation media 7 suitable for processing of a certain sample, such as particulate chromatography media. As the skilled person will appreciate, the porosity of the upper frit 5, as well as the properties of the elongated frit 6, should be adapted to retain the separation media 7 in position during processing.

Thus, the elongated frit 6 according to the invention may comprises a mesh 10 having dimensions adapted for the intended separation.

The mesh 10 of the elongated frit 6 may be maintained in position by an appropriately positioned hollow support 9 comprising one or more holes 8 at appropriate locations and of suitable sizes to allow for liquid to pass the mesh 10.

For example, the mesh 10 may be positioned anywhere sufficiently close to the support 9 to be retained in a position that allows for the above-described advantageous flow across and substantially perpendicular to the elongated frit 6. Thus, the mesh 10 may be attached to a support 9, coated on a support 9 or wrapped around a support 9. As the skilled person will appreciate, such a support 9 may be made of any suitable material which is inert towards the conditions of the intended process, such as plastic.

Specifically, the support 9 should be hollow to allow for a liquid flow to enter at one end and exit across the length of the supported mesh 10. The support 9 may be defined by a circular, oval, triangular or other angular cross section, such as a substantially circular cross section resulting in a tubular support.

Further, to allow for a desired flow, the support 9 should include some kind of liquid passages, such as holes 8. As illustrated in the FIG. 4, the elongated frit 6 according to the invention may comprise of a tubular support 9 including evenly positioned holes 8, onto which mesh 10 has been wrapped.

Various designs of the elongated frit are encompassed by the present invention. For example, as discussed above, the elongated frit may be tubular, or at least partly tubular. The elongated frit, or part thereof, may be designed as having a variable cross section, such as a tube having a smaller diameter at its lower end than at its upper end; or a smaller diameter at its upper end than at its lower end. The diameter in such a design may be changing with a constant and resemble a cone, or an upside down cone. Alternatively, it may be designed as a bulb, or any other shape as long as it provides for a liquid flow which at least partly is passing the elongated frit as discussed above.

As appears from FIGS. 1-3, the column of the device according to the invention may be provided with a tubular column end 4. The tubular column end 4 may be relatively long as compared to conventional columns and may e.g. be of a length that constitutes a suitable part of, such as about one third of, the length of the column. The skilled person can adapt the length of the column end 4 as well as the column bottom wall 2*b* for a desired process. Advantageously, as discussed elsewhere in the present application, the elongated tube is arranged to be of a shorter length than the actual column length, providing for a part of the column where liquid and dispersed media above the upper end of the elongated frit, as illustrated in the drawings. Thus, in a specific embodiment, the elongated frit has an end above which separation media is provided. Further, such an elongated frit will allow liquid flow substantially vertically, whereby collection of solid contaminants within the frit is avoided.

As shown in FIGS. 1-3, the tubular column end 4 and the elongated frit 6 may be arranged as an integral part (one single part, or tube, or fused parts) allowing for liquid to flow through both, in either direction.

The present column is advantageously dimensioned to fit a liquid processing system. Such systems are conventionally used in the area of chromatography and other separation, such as biomolecule processing, and may include a computer that controls all of, or parts of the process using the appropriate software.

Thus, the device according to the invention may include means for passing liquid between the upper and the lower end of the column, which means are capable of providing positive and negative pressure.

As the skilled person will appreciate, said means may be a pump, such as a displacement pump.

Alternatively, or additionally, specific means are provided to support for top down flow, i.e. for adding liquid to a top liquid inlet 1*b* of the column and allowing the liquid to descend either by gravity, or by pumping. As the skilled person will appreciate, a device according to the invention may be used in top down and/or aspiration/dispensing, or in any mix or combination thereof. The invention may for example provide for a process wherein sample and elution liquid are both aspirated and dispensed at the bottom liquid inlet/outlet 1*a*, while wash liquid may be added at the top liquid inlet 1*b*, and for example allowed to pass the column by gravity. In such a wash step, the column may be taken out of the liquid processing step to allow for convenient wash using the top liquid inlet 1*b*, and reinserted after the completed wash to proceed e.g. with a step of eluting target molecules.

As discussed above, the separation media 7 present in the column may be dispersed during liquid aspiration, i.e. in the upward stroke of the pump. This dispersion enhances the contact of the sample with the column media and capture of target molecules is made fast and more complete than many prior art methods.

In the downward stroke of the pump, the column bed repacks and fluid flows through the bed. The liquid flow diverts, moving perpendicular to the separation media back through the elongated frit and out the end of the column. This process can be repeated as many times as necessary. Thus, the device of the invention may advantageously be used in 'back-and-forth' flow, also known as dual flow chromatography (DFC).

The present invention has been shown to lower the backpressure in automatic processing of liquid samples, allowing for fast flows into the column and hence efficient sample processing.

Finally, the column volume of the separation device according to the invention is increased by the present design, so that up to 40 mL of sample can be processed in one stroke.

The device according to the invention may comprise two or more columns arranged for parallel processing, such as in automated processing.

The device according to the invention has been developed to capture, clean and recover biomolecules. In other words, the device may be used for one or more steps of a sample processing protocol preceding analysis of target molecule(s). Alternatively, the invention may be used in the separation of target molecules from complex liquid contents, where the device of the invention may be used in one or more steps of purification, optionally combined with conventional steps of purification of biomolecules such as centrifugation, chromatography, filtration, etc.

Thus, in a second aspect, the present invention relates to a method of separating at least one target molecule from a liquid, which method comprises providing at least one column, which is provided with a bottom liquid inlet/outlet 1*a* and optionally with a top liquid inlet 1*b*, which column retains a separation media 7; wherein at least part of an elongated frit 6 has been arranged substantially parallel to the column wall 2 and segregating the separation media 7 from the bottom liquid inlet/outlet 1*a*; and processing a liquid sample in said column in a method including aspiration and dispensing of fluid to and from the bottom liquid inlet/outlet 1*a*; adding a liquid at the top liquid inlet 1*b*; or any combination of using the bottom liquid inlet/outlet 1*a* and the top liquid inlet 1*b*.

More specifically, the method of the invention may comprise the steps of a) providing at least one column, which is provided with a bottom liquid inlet/outlet 1*a* and which retains a separation media 7; wherein at least part of an elongated frit 6 has been arranged substantially parallel to the column wall 2 and segregating the separation media 7 from the bottom liquid inlet/outlet 1*a;* b) providing a liquid which includes said at least one target molecule in admixture with other molecules;

c) placing the bottom liquid inlet/outlet 1*a* of the column into said liquid;

d) in an aspirating phase, applying a negative pressure to the column to bring liquid to pass from bottom liquid inlet/outlet 1*a* of the column and through the elongated frit 6 in a direction of flow which is substantially perpendicular to the column wall 2, whereby the liquid flow disperses the separation media 7; and, optionally, allowing time for capture of target molecule(s) by the separation media 7.

The method may comprise the further steps of e) in a dispensing phase, applying a positive pressure to the column to bring liquid to pass through the elongated frit 6 in a direction of flow which is substantially perpendicular to the column wall 2 towards the bottom liquid inlet/outlet 1*a* of the column; and f) collecting liquid exiting the bottom liquid inlet/outlet 1*a* of the column.

Optionally, the steps above are followed by the steps of g) repeating steps d) and f) with an eluting liquid that releases target molecules from the separation media 7; and h) collecting eluting liquid comprising released target molecule(s) via the bottom liquid inlet/outlet 1*a* of the column, optionally followed by a step of recovering and/or analyzing eluted target molecule(s).

The analysis of target molecule(s) may include any conventional or advantageous method, such as mass spectrometry (MS), optionally combined with chromatography, such as HPLC.

Further, the method may use back and forth flow of sample, wash and/or eluting liquid. Back and forth flow, also known as dual chromatography, is by now well known to the skilled person in this field, see e.g. U.S. Pat. No. 7,482,169 wherein processing with back and forth flow is described in detail.

As discussed above, since liquid may also be added to the top liquid inlet 1*b* of the column, the skilled person may vary the direction of liquid flow in a flexible way adapted to she specific circumstances.

As the skilled person will appreciate, one or more wash steps may be included after the aspiration of sample. Such wash step may be performed in the same manner as the aspiration step. One or more types of buffers may be used in the wash, and these washes may be performed in serial steps.

As the skilled person will appreciate, the wash may be performed in a top down flow of fluid where the fluid is introduced at the top liquid inlet 1*b* of the column. The fluid may flow through the column by gravity flow or a pump may be engaged to force fluid flow through the column The elution may also be performed in in back-and-forth fluid flow or in top down fluid flow.

The target molecule may be a biomolecule, such as a protein or nucleic acid, or a fragment thereof.

For example, the target molecule may be a protein selected from the group consisting of peptides and antibodies, such as Fab fragments.

Alternatively, the target molecule(s) may be a DNA or an RNA molecule, such as a plasmid, e.g. a conjugative or non-conjugative plasmid.

The liquid provided in step b) may originate from a cell culture or a chemical synthesis. In step d), a liquid volume may be in the range of about 20 mL to about 1 L is aspirated. For example, a liquid sample of 40 mL may be aspirated, or any larger volume, depending on the application.

The positive and negative pressures of steps d) and f) may be provided by a suitable pump, such as a displacement pump.

In step a), at least two columns may be provided and processed in parallel in subsequent steps.

The columns may comprise different separation media; and/or different liquids may be aspirated into the separate columns. 'Back-and-forth' flow, also known as dual flow chromatography (DFC), may be utilized in sample aspiration and/or elution, to increase the contact time between liquid and separation media.

The separation device according to the invention may be used in the present method. Thus, all details provided herein in relation to the device of the first aspect may be applicable to the method, and vice versa.

In one aspect of the invention, the above-discussed biomolecule may be a carrier of genetic material such as DNA or RNA. The carrier may be a modified or non-modified virus.

In this context, the term "a non-modified virus" is understood as a virus which carries at least one gene incapsulated by a protein coating and/or a lipid envelope, which virus is capable of reproduction inside the cells of a living host.

The term "a modified virus" is understood herein as any virus which has been modified as compared to its native state, for example a functional modification resulting in an attenuated virus; or a structural modification. The term "a modified virus" also include mutated virus forms.

Specifically, the target molecule separated according to the present invention may be an adenoassociated virus (AAV), which are replication-defective, non-enveloped viruses and have linear single-stranded DNA (ssDNA) genomes.

Since they are not capable of replication, AAV is commonly used as a vector to transport genetic material, for example in the context of gene therapy or vaccination.

Thus, in a specific aspect the present invention relates to a method of separating carriers of genetic information, preferably in the form of DNA or RNA, using a separation device as described in this application. Advantageously said carriers are viruses, such as adenoassociated virus (AAV).

The invention includes the separation of separating virus which includes genetic information. In an alternative, the invention includes the separation of virus envelopes, i.e. virus which do not comprise any genetic information. The latter kind of 'empty viruses' are useful as vectors in vaccine or gene therapy applications, and enables its user to insert any relevant genetic material to obtain the desired result.

Since the present separation device is easily adaptable to automatic processing, this aspect of the invention may constitute one step in an automated process for the manufacture of vaccines or gene therapy preparations.

Thus, in this aspect, the invention relates to a method of separating viruses which, using a at least one column provided with a bottom liquid inlet/outlet and including separation media; wherein at least part of an elongated frit has been arranged substantially parallel to the column walls and segregating the separation media from the bottom liquid inlet/outlet.

The column may part of a separation device as described in the present application. Illustrative volumes of such columns may be in the range e.g. of 1 or 2 liters chamber sizes, wherein the bed size may be 10 or 20 mL at the low end and up to 200 or 400 mL volumes of separation media. However, larger columns are equally useful, such as chamber volumes of 3 or 4 liters or above. This aspect of the invention may also be applied to the larger bio manufacturing size, such as 1 meter diameter columns as commonly used in the field.

The above-discussed carriers may be virus, e.g. adenoassociated virus (AAV) or parts or fragments thereof. Such AAV may include genetic information; or may be virus without genetic information capable of having inserted DNA or RNA, as desired, using technology well known to the skilled person.

Ion exchange carriers may be applied to any virus. Other affinity carriers may be applied to viruses. This involves developing affinity groups that select for proteins on the surface of the virus and attaching these group to separation media.

The separation media used in this aspect may comprise native polymers, such as agarose or cellulose. Such separation media are well known to the skilled person, and may be obtained e.g. for the capture step of the herein discussed carriers using affinity chromatography wherein a sample originating from a mammalian cell culture is applied to the column. Such sample may have been pre-treated to remove cells, which is preferred in the case of mammalian cells that secrete the carriers produced therein into the cell culture.

Thus, the invention includes an affinity chromatography method wherein the separation media comprises ligands which have been specifically designed to capture virus.

An advantage of this aspect of the invention is that the pressures will be low so plastic and column liners can be used, which is an advantage when separating fragile biomolecules, such as viral vectors, in comparison to the currently used stainless steel. Also, providing the herein described columns with separation media is very easy, since there will be no requirement pack uniformly nor under pressure.

DETAILED DESCRIPTION OF THE DRAWINGS

FIG. 1 is provided to illustrate how, in a column 1 of the separation device according to the invention, in use the liquid flow is directed from a bottom liquid inlet 1*a* and up during a phase of aspirating liquid. It appears clearly how liquid is aspirated and passed inside the column end 4 and on into the elongated frit 6, here shown as a hollow tube which has been integrated into one piece with the column end 4, were the aspirated liquid flows at an angle substantially perpendicular to an upper frit 5; or to the surface of the separation media 7.

A pump (not shown) may be fitted to the column top applying negative and positive pressures. In the dispersion mode, negative pressure is applied to the column top and liquid flows into the column at the distal end. The liquid flows into the column through the elongated frit 6 and disperses the separation media 7. The flow continues to travel into the column chamber 3. Dispersed separation media 7 is contained in the column by the upper frit 5. A typical column has an overall length of 206 mm with an end tube length of 67 mm and a column body diameter of 35 mm.

The liquid flow into the column disperses the separation media 7, allowing a quicker capture of target molecules, such as plasmids.

FIG. 2 illustrates, in the same column as in FIG. 1, how liquid can flow in the opposite direction, i.e. from the top towards a bottom liquid outlet of the column, during dispensing of liquid. It appears clearly how the liquid passes through the elongated frit 6 at an angle substantially perpendicular to the upper frit 5, in order to leave the column via the elongated frit 6 and the column end 4.

The liquid flow out of the column will repack the separation media similar to its original state, such as a more or less packed bed.

FIG. 3 is an expanded view of an elongated frit 6, here too shaped as a tube frit, arranged in separation media 7. Frit liquid passages 11 are shown schematically as holes 8 (size not shown in dimension). In the embodiment shown here the bottom holes 8 are larger allowing better drainage of the column in reverse flow mode (dispensing liquid). The number, size and density of the holes will vary depending on the particular column embodiment and the strength of the pump to disperse the separation media. As the skilled person will appreciate, as the holes' sizes are decreased, the velocity of the liquid flow increases, which in turn increases the dispersing ability of the elongated frit.

FIG. 3 also illustrates an advantageous feature of the column of the device of the invention in that the parallel column walls 2 ends, and the lower wall has a slope of about 45° to the vertical. Said slope of the lower wall may be varied, but is advantageously not 90° to the vertical.

FIG. 4 illustrates how an elongated frit 6 may be assembled by wrapping mesh 10 around a tubular hollow support 9.

In FIG. 4*a*, the hollow support 9 is shown as having holes 8 enabling fluid passage.

In FIG. 4*b*, a tube frit—an example of an elongated frit 6 according to the invention—has been assembled from a tubular hollow support 9 over which porous mesh 10 has been wrapped. Specifically, each hole 8 covered with mesh 10 will constitute a frit liquid passage 11. Thus, due to the mesh 10, the holes 8 of the hollow support 9 will not allow separation media 7 to leave the column.

FIG. 5 is a table outlining the general performance for plasmid purification according to the invention, specifically envisaged for three sizes having an elongated frit designed as a tube frit.

EXPERIMENTAL PART

The present examples are provided for illustrative purposes only and should not be construed as limiting the invention as defined by the appended claims. All references provided below and elsewhere in the present application are hereby included herein via reference.

Example 1. Maxi Prep Purification Process Using a 5 mL Bed Volume Column in an Automated Instrument for Plasmid Purification

TABLE 1

Buffers for maxi prep purification
Maxi Prep

| Buffers | Volume (mL) | Container | Storage Temperature for best yield |
|---|---|---|---|
| Resuspension Buffer (RB) | 29 | 60 mL bottle | 4° C. overnight |
| Lysis Buffer (LB) | 34 | 60 mL bottle | Room temperature |
| Precipitation Buffer (PB) | 41 | 60 mL bottle | 4° C. overnight |
| Endotoxin Removal Buffer (ERB) | 20 | 50 mL conical tube | 4° C. overnight |
| Equilibration Buffer (EQB) | 30 | 30 mL conical tube | Room temperature |
| Wash Buffer (WB) | 120 | Wash Buffer container | Room temperature |
| Elution Buffer | 60 | 30 mL conical tube (2) | Room temperature |

The buffers consist of:
- Resuspension Buffer: 50 mM Tris-HCl, pH8.0; 10 mM EDTA
- Lysis Buffer: 0.2 M NaOH; 2.5% SDS
- Precipitation Buffer: 2.04 M KOAc, pH 4.5
- Endotoxin Removal Buffer: Surfactant
- Equilibration Buffer: 50 mM Tris HCl, pH 7.0
- Wash Buffer: 50 mM Tris HCl, pH 7.0; 300 mM NaCl
- Elution Buffer: 50 mM Tris HCl, pH 8.5; 500 mM NaCl Buffer Aliquot (Manual)
- Aliquot the buffers according to the table below, the volumes are enough for one sample.
- Add 29 μL of 0.1 mM thymolphthalein into the resuspension buffer.
- Store the buffers at recommended temperature overnight before usage.

Cell Lysate Preparation (Manual)
- Weight out 3 g of wet, fully thaw *E. coli* cell pellet
- Add RNase (20 mg) into Resuspension Buffer and mix well
- Add Resuspension Buffer with added RNase into the cell pellet and shake vigorously to break up the pellet
- Add Lysis Buffer into the cell mixture and gently capsizing the mixture until the solution turn completely blue (around 20-30 times)
- Add Precipitation Buffer into the cell mixture and gently capsizing the mixture until the solution turn completely white and no more blue color observed (around 20 times)

- Keep the cell bottle upside down until the separation between the cell lysate and cell debris is observed
- Gently pour the cell lysate sample into the filter in Instrument Sample Box to separate the cell lysate from cell debris
- Final collected cell lysate sample will be around 60-80 mL Automated instrument: A fully automated instrument for plasmid purification was obtained from Phynexus (http/phynexus.com), adapted for the herein used sample volumes and provided with an elongated frit designed as a tube frit at its bottom end. Specifically, the tube frit used herein was designed in accordance with the drawings.

Refiltration:
- Sample volume after filtration: 60-80 mL
- Aspirating 20 mL from sample box and expel 20 mL at rate=30 mL/min on top of the filter
- Do this for 10 additions Incubation:
- Transfer 15 mL of ERB endotoxin removal buffer to the sample box
- Delay for 30 min Equilibrate Column:
- Engage the tube frit column
- Aspirate and expel 30 mL of EQB (4 times)

Capture:
- Aspirate 30 mL of semi-clarified lysate and expel into first position, A1B1.
- Aspirate and expel 25 mL 7 times
- Input pauses after each cycle (to collect sample for agarose gel)

Wash:
- Aspirate and expel 30 mL of wash buffer
- Aspirate 30 mL of wash buffer from the wash buffer reservoir
- Expel 30 mL of wash buffer into the WASTE position
- Do into of 60 mL of wash buffer.
- Input pause to collect wash sample for agarose gel Elution: Maxi Prep
- Aspirate 30 mL from elution buffer
- Expel 30 mL of elution buffer into another conical tube.
- Collect 20 mL, Concentration is 150 μg/mL

Example 2. Buffer Volumes and Pellet Weights for Purifying Giga Prep and Mega Prep Scale Plasmid Purifications The instrument described in Example 1 was used in this example 2.

TABLE 2a

Buffer volumes and pellet weight for purifying giga prep scale plasmid purification
Giga Prep (Cell Pellet Weight = 15 g)

| Buffer | Volume (mL) |
|---|---|
| Resuspension Buffer | 87 |
| Lysis Buffer | 103 |
| Precipitation Buffer | 123 |
| Endotoxin Removal Buffer | 30 |
| Equilibration Buffer | 30 |
| Wash Buffer | 500 |
| Elution Buffer | 60 two aliquots |
| Column Resin Volume | 20 |

Refiltration

Transfer 40 mL of semi clarified lysate out of the sample reservoir and into the first position (A1B1)

Aspirate 20 mL of semi clarified lysate and expel 20 mL (30 mL/min) on top of the filter.

This is repeated 10 times

Incubation 25 mL of Endotoxin Removal Buffer (ERB) is added to the sample reservoir.

Incubate for 28 minutes

Equilibration

Column aspirates and expels 30 mL of equilibration buffer for 4 cycles

Capture 30 mL of lysate is transferred from sample box to positions A1B1-A4B4.

Each cycle aspirates 25 mL (500 mL/min) and expels 25 mL (70 mL/min)

The column will perform the 8, 4, 2 and 2 cycles in A1B1, A2B2, A3B3, and A4B4, respectively.

Elution: Giga Prep

Aspirate 30 mL from elution buffer

Expel 30 mL of elution buffer into another conical tube.

Repeat Process on next sample aliquot

TABLE 2b

Sample volumes giga prep scale

| Sample Name | Nucleic Acid (ng/L) | A260/ A280 | A260/ A230 | A260 | A280 | Vol (mL) | Yield (mg) |
|---|---|---|---|---|---|---|---|
| 15 g giga elution 1 | 188.97 | 1.87 | 2.22 | 3.78 | 2.02 | 29.44 | 5.56 |
| 15 g giga elution 2 | 227.56 | 1.87 | 2.24 | 4.36 | 2.33 | 28.88 | 6.57 |
| | | | | | | | 12.14 mg total volume |

Example 3. Buffer Volumes and Pellet Weight for Mega Prep Scale Plasmid Purification The instrument described in Example 1 was used in this example 3.

TABLE 3

Buffer volumes and pellet weight for mega prep scale plasmid purification Mega Prep (Cell Pellet Weight = 7.5 g)

| Buffer | Volume (mL) |
|---|---|
| Resuspension Buffer | 44 |
| Lysis Buffer | 52 |
| Precipitation Buffer | 62 |
| Endotoxin Removal Buffer | 20 |
| Equilibration Buffer | 30 |
| Wash Buffer | 300 |
| Elution Buffer | 60 |
| Column Resin Volume | 10 |

Example 4. Purification of wtAd5 AAV Virus

Any solid phase separation media having a functional group or a solid surface that can bind or partially bind virus particles may be used in the column of the invention.

In this example, serotype-specific Capture Select resins AAV8 and AAV9 are used for the purification of wtAd5 AAV virus. AAV vectors are produced by transient transfection. HEK293 cells are transfected using polyethyleneimine, polyethylene imine (PEI), and a 1:1:1 ratio of the three plasmids (inverted terminal repeat [ITR] vector, AAV rep/cap, and Ad helper plasmid). Transfected cells are grown in the presence of puromycin and are screened for AAV productivity following infection with wtAd5 virus. Cell pellets are harvested by centrifugation. The cell pellet is resuspended in 20 mM Tris [pH 7.5], 150 mM NaCl, 10 mM $MgCl_2$. Benzonase and 0.1% Triton X-100 are added to suspended cells and the mixture is incubated at 37 degrees C. for 15 min to lyse the cells. The lysed mixture is centrifuged, and the supernatant is removed. The supernatant is filtered to produce clarified cell lysate containing AAV vector.

Two 50 mL chamber volume tube frit columns are packed with 10 mL each of AAV8 and AAV9 capture media. The columns are operated in back and forth flow at 100 mL/min. The columns were equilibrated with phosphate buffered saline (PBS) pH 7-7.5.

In other examples the column may be equilibrated with 10-50 mM sodium phosphate or Tris pH 6-8. 0.1-0.2 M NaCl or KCl may added to the conditioning buffer to prevent nonspecific adsorption due to protein/protein interactions.

40 mL of the clarified cell lysate containing the rAAV vector is loaded onto the columns. The column is fully loaded. Addition aliquots of the sample virus are added as needed to fully load the column. After loading of the virus, unbound non-virus material is washed from the column.

Generally, two 40 mL washes are used. Samples with high impurity levels may require more wash steps with fresh wasting solution. Washing with a secondary or intermediate wash can increase impurity removal and make impurity clearance more predictable especially when there is interaction with the protein of interest and the impurity.

Secondary wash options include high-salt washes of up to 1 M NaCl. A Tris buffer may be added testing the effect of pH. Other additives include surfactants such as up to 0.05% (v/v) Tween 20. Chaotropic salts such as up to 0.2 M $MgCl_2$ may be added. However, buffers containing phosphates must be avoided to prevent precipitation with Mg' cation. Up to 20% ethanol may be added provided the lipid and capsid structure of the virus is not damaged.

Target virus particles differ in their binding and elution behavior and optimum elution conditions are determined experimentally. A starting point may be 50-100 mM citric acid pH 3.0. This can be lowered to pH 2. Other elution buffer components that can be used include phosphate, hydrochloric acid, glycine, acetate, or other components that buffer well at low pH. Other additives may be up to 2 M pH 7 $MgCl_2$ and/or up to 50% propylene glycol. Combinations of these components can be used to optimize elution conditions.

A step gradient elution is used remove impurities and obtain a concentrated elution fraction. A fully loaded column is used. Otherwise, there may not be efficient release of the virus due to re-binding events during elution. The recovered virus is immediately neutralized to prevent denaturation of some molecules at low pH. The eluted virus solution was neutralized by adding 1 M pH 8.7 Tris-HCl.

Example 5. Purification of Influenza and Dengue Viruses

A single-step purification of influenza and dengue viruses using CHT XT Media (BioRad). A tube frit column having a 50 mL chamber was packed with 20 mL of the media. The two samples are ssRNA Influenza virus 80-120 nm diameter and ssRNA Dengue virus 50 nm diameter.

Production of the Influenza virus, Strain A/California/07/2009, is cultured on MOCK cells in minimal essential medium (MEM; Gibco) containing 10% fetal bovine serum (FBS) and L-glutamine in 225 mL flasks. When the cells are almost confluent, influenza virus is inoculated onto the cell monolayer at a 1:3,000 dilution in 75 ml of D-MEM/F-12 with trypsin, penicillin, and streptomycin (flu culture medium). The supernatant is harvested on days 3, 4, and 11 and clarified through 0.45 μm filters.

Production of the Dengue virus: Type 2 strain ThNH7/93 is cultured on C6/36 cells. Cells are grown in 225 mL flasks that are precoated with poly-L-lysine at 100 lag/ml in phosphate buffered saline (PBS). Cells are cultured in modified EMEM Minimum Essential culture medium (MP Biomedicals) containing 10% FBS at 28° C. for 1 week. After the cells reach confluence, dengue virus type 2 is inoculated at a 1:1000 dilution onto the cell monolayer in 75 mL of modified EMEM containing 0.5% FBS and MEM Vitamin Solution (Invitrogen Corporation) and then cultured at 28° C. The medium is changed at day 3 and culture fluid (about 75 mL) was collected at day 7. The culture fluid was filtered through a 0.45 μm filter to remove cells and large cell debris.

The columns are operated in back and forth flow at 100 mL/min. The viral purifications are performed as shown in Table 4 for influenza virus and Table 5 for dengue virus.

TABLE 4

Influenza purification protocol

| Step | Buffer solvent | pH | Volume, mL |
|---|---|---|---|
| Pre-wash | 1M NaOH | | 40 |
| Wash | 600 mM sodium phosphate | 7.2 | 40 |
| Equilibration | 10 mM sodium phosphate | 7.2 | 40 |
| Sample loading (repeated until fully loaded) | 144 mM sodium phosphate | 7.2 | 40 |
| Wash | 144 mM sodium phosphate | 7.2 | 40 |
| Elution | Step gradient elution from 144-600 mM sodium phosphate | 7.2 | 40 |

TABLE 5

Dengue purification protocol

| Step | Buffer solvent | pH | Volume, mL |
|---|---|---|---|
| Pre-wash | 1M NaOH | | 40 |
| Wash | 600 mM sodium phosphate | 7.2 | 40 |
| Equilibration | 10 mM sodium phosphate | 7.2 | 40 |
| Sample loading (repeated until fully loaded) | 144 mM sodium phosphate | 7.2 | 40 |
| Wash | 10 mM sodium phosphate | 7.2 | 40 |
| Elution | Step gradient elution from 144-600 mM sodium phosphate | 7.2 | 40 |

Wash and loading conditions may be varied to optimize the yield and purity of the virus.

The invention claimed is:

1. A separation device comprising:

at least one column having one or more side walls; and a bottom liquid port adapted to receive a separation medium; wherein the at least one column includes an elongated frit including a portion arranged substantially parallel to the one or more side walls and configured to segregate the separation medium from the bottom liquid port, wherein the elongated frit comprises a tubular support and a mesh, and wherein the tubular support has an outer surface, the mesh is wrapped around the outer surface and the outer surface faces the separation medium.

2. The separation device according to claim 1, wherein the elongated frit is not arranged horizontally in the at least one column relative to a longitudinal axis of the at least one column.

3. The separation device according to claim 2, wherein at least part of the elongated frit is arranged at an angle between about 45 and 90° to a horizontal plane of the at least one column relative to the longitudinal axis of the at least one column.

4. The separation device according to claim 1, wherein the elongated frit is arranged for enabling a liquid to flow perpendicular and parallel to the one or more side walls.

5. The separation device according to claim 1, further comprising a top liquid inlet.

6. The separation device according to claim 1, further comprising an upper frit arranged in the at least one column at a first position enabling the at least one column to receive separation media below said upper frit.

7. The separation device according to claim 6, wherein said first position in the at least one column defines a first volume comprising the separation medium and a second volume below said upper frit free of separation media.

8. The separation device according to claim 1, wherein the mesh is maintained in a second position by a hollow support including at least one hole.

9. The separation device according to claim 8, wherein the hollow support is defined by a circular cross section, an oval cross section, a triangular cross section.

10. The separation device according to claim 1, wherein the at least one column comprises a bottom including a tubular column end.

11. The separation device according to claim 10, wherein the tubular column end comprises a first length and the at least one column comprises a second length three times the first length.

12. The separation device according to claim 10, wherein the tubular column end and the elongated frit are arranged as one integral part.

13. The separation device according to claim 10, wherein the at least one column includes a sloped column bottom wall.

14. The separation device according to claim 10, further comprising a liquid processing system wherein the at least one column is within the liquid processing system.

15. The separation device according to claim 10, wherein the at least one column includes an upper end and a lower end, the separation device further comprising a means for passing the liquid between the upper end of the at least one column and the lower end of the at least one column.

16. The separation device according to claim 15, wherein said means is configured to apply a positive pressure or a negative pressure to the at least one column.

17. The separation device according to claim 15, wherein the at least one column comprises two or more columns arranged for parallel processing.

18. A method of separating at least one target molecule from a liquid sample using the separation device of claim 1, the method comprising separating at least one target molecule from the liquid sample by (a) aspirating and dispensing fluid to and from the bottom liquid port or by (b) adding a liquid at a top liquid inlet of the at least one column and dispensing the liquid from the bottom liquid port; or by both (a) and (b).

19. The method according to claim 18, wherein the liquid sample includes said at least one target molecule in admixture with one or more molecules;

the method further comprising:

placing the bottom liquid port into said liquid sample;

wherein the aspirating comprises enabling a liquid to pass from the bottom liquid port and through the elongated frit in a direction of flow substantially perpendicular to the one or more side walls by applying a negative pressure to the at least one column, whereby the liquid disperses in the separation medium; and optionally allowing a time for the separation medium to capture the at least one target molecule.

20. The method according to claim 19, wherein the dispensing comprises enabling the liquid to pass through the elongated frit in a direction of flow substantially perpendicular to the one or more side walls towards the bottom liquid port by applying a positive pressure to the at least one column; the method further comprises collecting the liquid exiting the bottom liquid port.

21. The method according to claim 18, wherein the at least one target molecule is a biomolecule comprising a protein or a nucleic acid, or a fragment thereof.

22. The method according to claim 21, wherein the at least one target molecule is a protein selected from the group consisting of a peptide, an antibody and a Fab fragment.

23. A method according to claim 21, wherein the at least one target molecule is a plasmid.

24. The method according to claim 21, wherein the liquid is from a cell culture or from a chemical synthesis.

25. The method according to claim 21, wherein the aspirating comprises aspirating a volume of the liquid between 20 mL and 5 L.

26. The method according to claim 19, wherein the applying the positive pressure and the applying the negative pressure comprising activating a displacement pump.

27. The method according to claim 21, wherein the at least one column comprises at least two columns comprising at least a first column and a second column.

28. The method according to claim 27, wherein the first column comprises a first separation medium, the second column comprises a second separation medium, and the first separation medium has a first functionality and the second separation medium has a second functionality different from the first functionality.

29. The method according to claim 27, wherein the aspirating further comprises aspirating the liquid into the second column.

30. The method according to claim 18, wherein the aspirating comprises applying back-and-forth flow to the liquid.

* * * * *